United States Patent [19]
Kulakov et al.

[11] 4,318,955
[45] Mar. 9, 1982

[54] METHOD FOR MAKING A CARBONIC FRICTION PRODUCT

[76] Inventors: Valery V. Kulakov, ulitsa Sayanskaya, 11, kv. 473; Valentin P. Judin, ulitsa Svobody, 13/2, kv. 225; Antonina I. Pavlova, Sirenevy bulvar, 1, korpus 3, kv. 65; Anatoly M. Zlatkis, ulitsa Efremova, 12, kv. 15; Georgy N. Bagrov, Universitetsky prospekt, 23, korpus 4, kv. 16, all of Moscow; Ivan I. Zverev, ulitsa Sovetskaya, 7/9, kv. 23, Balashikha Moskovskoi oblasti; Iosif I. Khazanov, ulitsa Krupskoi, 9, kv. 28, Balashikha Moskovskoi oblasti; Alexei V. Suvorov, ulitsa Kalininskaya, 82, kv. 9, Balashikha Moskovskoi oblasti; Alexei A. Bobrinsky, 1 Vladimirskaya ulitsa, 24/1, kv. 3; Vladimir A. Pasynkov, Yartsevskaya ulitsa, 27/7, kv. 23, both of Moscow, all of U.S.S.R.

[21] Appl. No.: 151,142

[22] Filed: May 19, 1980

Related U.S. Application Data

[63] Continuation of Ser. No. 936,813, Aug. 25, 1978, abandoned.

[51] Int. Cl.$^3$ .................. B29C 25/00; C01B 31/00
[52] U.S. Cl. ................... 428/235; 156/154; 156/155; 156/281; 428/236; 428/408; 428/902; 264/29.2; 264/29.5
[58] Field of Search ............... 156/154, 155, 281; 428/235, 236, 408, 902; 264/29.2, 29.5

[56] References Cited

U.S. PATENT DOCUMENTS

| 3,956,548 | 5/1976 | Kovac | 428/902 |
| 3,991,248 | 11/1976 | Bauer | 428/245 |

FOREIGN PATENT DOCUMENTS

| 2722575 | 5/1977 | Fed. Rep. of Germany . |
| 923050 | 8/1961 | United Kingdom . |
| 1423240 | 3/1972 | United Kingdom . |
| 2002685 | 7/1978 | United Kingdom . |
| 2003845 | 9/1978 | United Kingdom . |
| 2004855 | 9/1978 | United Kingdom . |

*Primary Examiner*—Marion McCamish
*Attorney, Agent, or Firm*—Lilling & Greenspan

[57] ABSTRACT

A method for making a carbon friction product comprises laying a reinforcing support, impregnating it with a binder, heat treating and subsequent machining to form a desired product which is then saturated with pyrocarbon and subjected to heat treatment at graphitization temperature. The reinforcing support is formed by piling up a pack of alternating layers of interwoven carbon fibers and layers of individual elementary fibers, the individual elementary fibers being oriented in such a manner as to partially penetrate the layers of interwoven fibers.

6 Claims, No Drawings

METHOD FOR MAKING A CARBONIC FRICTION PRODUCT

This is a continuation of application Ser. No. 936,813, filed Aug. 25, 1978 now abandoned.

The invention relates to carbon compositions, and more specifically to methods for making carbon friction products.

The invention may be most advantageously used, e.g. for making aircraft brakes.

It is general knowledge to make carbon friction products by a method comprising the steps of laying layers of carbon fabric which define a reinforcing support, impregnating it with a binder and heat treating to obtain a blank which is then machined to produce a desired product. The resultant product is saturated with pyrocarbon and heat treated at graphitization temperature.

By the above-described method, the reinforcing support is laid, e.g. by placing carbon fabric in layers which are then impregnated with an organic binder.

The resultant blanks comprise fabric layers which are interconnected by a film of an organic binder of non-uniform thickness. Thin films of resin are formed where the fiber particles contact, and large volumes of binder are formed in the zones of interfiber voids. This results in non-uniform shrinkage of blanks during roasting, formation of coarse pores, cracks, and shells, and in certain cases, stratification of the products.

In addition, physical and chemical properties of the binder at the points of contact of fiber particles and in the zones of interfiber voids are also non-uniform. The binder strength is maximum at the contact points and minimum in the interfiber voids. All of the above results in the fact that carbon friction products obtained by the above-described method have a large number of internal flaws (cracks, shells and the like) and non-uniform structure. The latter has the strongest negative effect on the stability of friction performance.

The attempts to eliminate the disadvantages associated with an organic binder resulted in the provision of a method for making friction products by using pyrolytic deposition of a binder from a gaseous phase.

Carbon materials obtained by this method feature a low degree of reinforcement. Volumetric content of fiber does not exceed 20-40% of the total volume of the material since the initial density of the fabric pack is very low. All this results in the fact that the resultant material is formed of layers of reinforced pyrocarbon alternating with layers of non-reinforced pyrocarbon. Thermal properties as well as friction performance of reinforced and non-reinforced pyrocarbon are different, hence changes in friction performance and decrease in stability can occur as friction members of such material are worn off.

It is common knowledge that compositions obtained by the known method with the use of non-oriented individual carbon fibers are most uniform as regards friction performance. Friction performance of the material obtained by such method is sufficiently stable. The disadvantage of the friction material obtained by the known method resides in its low cracking resistance under elevated dynamic and static loads.

It is an object of the invention to provide carbon friction products exhibiting stable performance during operation.

Another object of the invention is to increase the coefficient of friction of a carbon friction product.

Still another object of the invention is to improve interlayer strength of carbon products.

A further object of the invention is to improve isotropy of physical properties of a carbon friction product.

The invention resides in a method for making a carbon friction product which comprises the steps of laying a reinforcing support by piling up a pack of alternating layers of interwoven carbon fibers and layers of individual graphitized elementary fibers, said elementary fibers being oriented in such a manner as to partially penetrate the layers of interwoven fibers, with subsequent impregnation of the resultant reinforcing support with a binder and heat treatment to obtain a blank which is machined to form a desired product, impregnating the product with pyrocarbon and heat treating it at graphitization temperature.

The above-described method for making a carbon friction product ensures an improvement of stability of friction performance of the product by eliminating layer-to-layer non-uniformity of the material which is associated with the presence of relatively thick films of non-reinforced binder therein.

In this method elementary graphitized fibers are incorporated in the binder layer, which are oriented during the laying of the reinforcing support in such a manner as to ensure their penetration into the layers of interwoven fibers.

Incorporation of individual graphitized elementary fibers in the binder layer lowers the probability of the formation of substantial interfiber voids resulting in the appearance of coarse pores, shells and laminations in the blank during roasting. Partial penetration of the scattered carbon fiber into the layer of interwoven fibers also prevents the products from stratifying during operation.

The use of this method with the pyrolytic deposition of binder from a gaseous phase enables the elimination of a thick layer of pyrocarbon in the finished product thus improving the stability of friction performance of the product.

Another advantage of the method according to the invention resides in that two types of reinforcing fillers with different elasticity moduli are most likely to participate in the operation at the friction surfaces of co-operating parts. This provides for a greater coefficient of friction since high-modulus components can penetrate a low-modulus pattern to a greater depth.

The coefficient of friction of a carbon composition depends to a large degree on orientation of fibers relative to the friction surface. With the orientation at right angles to the friction surface, the coefficient of friction is generally at its maximum. With the fiber penetration by this method, the fibers are partially oriented at right angles to the friction surface which also contributes to an increase in the coefficient of friction, including the coefficient of static friction. It is most important that the wear of friction members with such method of improving the coefficient of friction does not practically increase.

The piling up of the reinforcing support into a pack is preferably effected by forcing an aqueous suspension containing individual elementary fibers sequentially through each layer of interwoven carbon fibers.

This facility ensures a partial orientation of individual carbon fibers enabling them to penetrate the layers of interwoven fibers.

The pack of reinforcing support may be piled up by forcing an air stream containing individual elementary fibers sequentially through each layer of interwoven fibers thus considerably reducing the time for piling up the reinforcing support by eliminating the drying step.

The main distinction of all products made in accordance with the invention resides in a high-grade friction performance. The stability of the coefficient of friction of aircraft braking members made by the method according to the invention, even under static conditions of engines is about 90% of what might be achieved during normal landing. During normal landing typical values of coefficients of friction for compositions on the basis of rayon fabric and individual polyacrylonitrile elementary fibers are from 0.38 to 0.40; for compositions on the basis of interwoven polyacrylonitrile fibers and individual fibers of the same feedstock, the coefficient of friction is somewhat lower and amounts to 0.30-0.35.

Other objects and advantages of the invention will become apparent from the following specific examples of the method.

EXAMPLE 1

Friction products were made of graphitized rayon cloth of 8-heald satin interweaving and a pitch binder.

A reinforcing support was prepared by piling up a pack consisting of alternating layers of graphitized rayon cloth and layers of individual graphitized elementary fibers. Individual elementary fibers of a length from 0.1 to 5 mm were obtained in a nutsch filter under intense stirring by means of a propeller stirrer of chopped graphitized thread on the basis of polyacrylonitrile.

Then a pack was piled up by forcing a stream of an aqueous suspension containing particles of fiber and pitch through the cloth layers by means of a vacuum pump. The following proportioning of components was used (in % by weight): carbonic cloth—15, individual graphitized elementary fibers—25, coal pitch with a 65° C. softening point—the balance.

After compression molding and heat treatment of the pack, a blank was obtained which was roasted to 1200° C. at an average rate of temperature rise of 20° C./h, re-impregnated with pitch and roasted. To make friction products, the blanks were machined, saturated with pyrocarbon at 950°-980° C. during 90 hours and heat treated at 2000° C. The resultant carbonic friction products may be used as friction members for an aircraft wheel. The density of the products is 1.65 g/cm$^3$.

EXAMPLE 2

Friction products were made of a carbonized polyacrylonitrile fiber which is laid in such a manner as to orient individual fibers in the direction of application of maximum stresses in a braking disc; for instance, a spiral winding with radial interweaving can be used.

Then a reinforcing support was prepared by piling up a pack consisting of alternating layers of interwoven polyacrylonitrile thread and layers of elementary graphitized fibers. Individual graphitized elementary fibers were obtained as described in Example 1 and dried to achieve a constant weight.

Then a pack was piled up by the dry method by forcing an air stream containing individual elementary fibers by means of a high-pressure pump through layers of interwoven carbon fibers.

The pack was fixed in a clamp and saturated with pyrocarbon until the density increased to 1.6 g/cm$^3$. The blank was heat treated at 2000° C. and machined to remove the surface layer, than saturated with pyrocarbon again to a density of 1.7 g/cm$^3$. Repeated heat treatment and pyrocompaction steps with removal of surface layers can ensure the density of discs to be as high as 1.75-1.80 g/cm$^3$. The friction products obtained by this method are most preferably used as friction discs in heavily loaded aircraft wheels.

What is claimed is:

1. A method for making a carbon friction material comprising: providing a reinforcing support containing a series of layers of interwoven carbon fibers wherein each of said layers are partially penetrated by a series of oriented individual fibers, said penetration being accomplished by forcing a fluid, containing the individual fibers, sequentially through each layer of interwoven carbon fibers; impregnating said reinforcing support with a binder; subjecting said reinforcing support to a heat treatment to obtain a blank; machining said blank for obtaining a desired product, with subsequent saturation of the resultant product with pyrocarbon and heat treatment thereof at a graphitization temperature.

2. A method according to claim 1, wherein said pack piling is effected by forcing an aqueous suspension containing said elementary individual fibers sequentially through each layer of said interwoven carbon fibers.

3. A method according to claim 1, wherein said pack piling is effected by forcing an air stream containing said individual elementary fibers sequentially through each layer of said interwoven fibers.

4. A product formed by the method of claim 1.

5. A method according to claim 4, wherein the fluid is selected from the group consisting of water and air.

6. A method according to any of claims 2, 3, or 1 wherein the impregnation of the reinforcing support with a binder occurs at the same time as the fiber penetration.

* * * * *